United States Patent [19]

Ohno et al.

[11] Patent Number: 5,424,523
[45] Date of Patent: Jun. 13, 1995

[54] RECORD MEDIUM AND RECORD MEDIUM PROCESSING APPARATUS

[75] Inventors: Tadayoshi Ohno, Kawasaki; Mitsuaki Kohyama, Tokyo, both of Japan

[73] Assignee: Kabushiki Kaisha Toshiba, Kawasaki, Japan

[21] Appl. No.: 151,832

[22] Filed: Nov. 15, 1993

[30] Foreign Application Priority Data

Nov. 25, 1992 [JP] Japan ................... 4-315352
Mar. 25, 1993 [JP] Japan ................... 5-066290

[51] Int. Cl.6 ................... G06K 7/08; G06K 19/06
[52] U.S. Cl. ................... 235/449; 235/493; 283/82
[58] Field of Search ............... 235/449, 384, 493, 487; 283/72, 82

[56] References Cited

U.S. PATENT DOCUMENTS

| | | | |
|---|---|---|---|
| 3,873,975 | 3/1975 | Miklos et al. | 235/449 X |
| 3,986,206 | 10/1976 | Fayling | 235/449 X |
| 4,004,136 | 1/1977 | Torok et al. | 235/449 X |
| 4,114,029 | 9/1978 | Lee | 235/449 |
| 4,455,484 | 6/1984 | Whitehead | 283/82 X |
| 4,982,076 | 1/1991 | Fujita | 235/449 X |

FOREIGN PATENT DOCUMENTS

| | | |
|---|---|---|
| 5094906 | 7/1975 | Japan . |
| 60-220475 | 11/1985 | Japan ................... 235/449 |
| 63-271698 | 11/1988 | Japan . |
| 3116594 | 5/1991 | Japan . |
| 3151294 | 6/1991 | Japan . |
| 3219432 | 9/1991 | Japan . |

*Primary Examiner*—Donald Hajec
*Assistant Examiner*—Michael G. Lee
*Attorney, Agent, or Firm*—Cushman Darby & Cushman

[57] ABSTRACT

With an automatic wicket apparatus, a commutation ticket is provided with a second record section for recording a character pattern corresponding to information for entrance or exit in the form of a magnetic latent image, besides a first record section for encoding and recording the information for entrance or exit. At the time of entrance, a character pattern including the date of entrance and entraining station name is recorded as a magnetic latent image in the second record section. At the time of exit, a character pattern including the date of exit and alighting station name is recorded as a magnetic latent image in the second record section. In case of suspicion, the character pattern in the form of a magnetic latent image in the second record section of the record medium is visualized by using a magnetic latent image-visible image conversion member.

9 Claims, 10 Drawing Sheets

RECORD MEDIUM AND RECORD MEDIUM PROCESSING APPARATUS

BACKGROUND OF THE INVENTION

1. Field of the Invention

The present invention relates to a record medium, such as a commutation ticket used in an automatic wicket system, and a record medium processing apparatus.

2. Description of the Related Art

Automatic wicket systems which are installed at gateways of facilities, such as railroad stations, in order to eliminate or reduce labor are known. In these systems, commutation tickets deposited therein by users of the facilities are checked as the users enter, leave, or change the facilities. If the tickets are proper ones or are used properly, the users are allowed to pass through the gateways, and if not, they are prevented from passing therethrough.

These automatic wicket systems read information (e.g., entraining or alighting station name, etc.), magnetically recorded in a commutation ticket inserted by the user entering, leaving, or changing the station, and allows or prevents the passage of the user in accordance with the read information. These automatic wicket systems using magnetic commutation tickets are becoming widespread.

Proposed in Jpn. Pat. Appln. KOKAI Publication Nos. 3-116594 and 3-219432 are systems in which a commutation ticket is provided with a record display layer capable of repeated recording such that the state of the display layer is changed at the time of entrance or exit. Proposed in Jpn. Pat. Appln. KOKAI Publication No. 3-151294, moreover, is an automatic wicket machine using a commutation ticket which is provided with a record section for recording commutation ticket information and means for indicating a reloadable balance.

These proposed arrangements have an advantage in that they are capable of repeatedly recording and erasing images. However, the durability of repeated recording is a problem with a commutation ticket which is repeatedly used several thousand times. Further, the processing time is long, since these systems additionally require thermal recording whose speed is lower than that of the magnetic recording.

Described in Jpn. Pat. Appln. KOKAI Publication No. 50-94906 is a display medium, as a high-durability medium, in which magnetic particles are sealed in a space over a magnetic record layer which constitutes part of the medium. According to this display medium, at least part of magnetic code information is converted into characters for magnetic recording in the magnetic record layer, and the magnetic information in the form of the characters is visualized by means of the magnetic particles sealed in the space so that the information is externally visible. However, this medium is subject to a drawback that its mechanical strength is lowered by the space therein.

In Jpn. Pat. Appln. KOKAI Publication No. 63-271698 there is described a system in which transaction information is recorded as a magnetic latent image of characters in part of a magnetic record layer of a magnetic card, and the latent image is visualized by using a special viewer. According to this display system, there is no need of the aforesaid space for containing the magnetic particles, so that the mechanical strength of the card can be improved.

In the display system arranged in this manner, however, encoded magnetic information and magnetic latent image of characters are recorded in the common magnetic record layer. When visually observing the information through the viewer, therefore, the encoded information is inevitably visualized together with the latent image of characters. Thus, the security of the encoded magnetic information is a delicate problem.

SUMMARY OF THE INVENTION

The present invention has been contrived in consideration of these circumstances, and an object of the invention is to provide a record medium processing apparatus enjoying high durability and mechanical strength for magnetic recording, capable of quick processing, and allowing a user of a record medium to recognize suspected contents in the record medium through display.

Another object of the present invention is to provide a record medium capable of displaying only a character-pattern magnetic latent image without visualization of the encoded magnetic information when the user of the facilities is suspected of using a wrong user card, and a record medium processing apparatus for processing the record medium, e.g., reading from or writing magnetic information in the record medium.

In order to achieve the above objects, a record medium processing apparatus according to the present invention comprises means, having a plurality of reading portions arranged at first intervals, for reading information recorded in recording tracks of a recording medium; means for storing reference information; means for detecting a predetermined relationship between the information read by the reading means and the reference information stored in the storing means; and means, having a plurality of recording portions arranged at second intervals shorter than the first intervals, for recording a predetermined character pattern as a magnetic latent image in the magnetic recording layer when the detecting means detects the predetermined relationship.

According to another aspect of the present invention a processing apparatus comprises first reading means for reading encoded magnetic information recorded in a record medium, first decision means for determining whether the information read by the first reading means is proper or not, first recording means for recording new encoded magnetic information in the record medium when it is concluded by the first decision means that the read information is proper, second recording means for recording a predetermined character pattern as a magnetic latent image in the record medium when it is concluded by the first decision means that the read information is proper, second reading means for reading the information recorded by the first recording means after the recording by the second recording means is finished, and second decision means for determining, by the information read by the second reading means, whether the information recorded by the first recording means is proper or not.

According to the present invention, it is preferable that the first writing means includes a plurality of magnetic heads arranged at first intervals, and the second writing means includes a plurality of magnetic heads arranged at intervals narrower than the first intervals.

According to the record medium processing apparatus of the invention constructed in this manner, the record medium, such as a commutation ticket, is provided with a second record section for recording a character pattern corresponding to information for entrance or exit in the form of a magnetic latent image, besides a first record section for encoding and recording the information for entrance or exit. At the time of entrance, a character pattern including the date of entrance and entraining station name is recorded as a magnetic latent image in the second record section. At the time of exit, a character pattern including the date of exit and alighting station name is recorded as a magnetic latent image in the second record section. If the user is suspected of using the record medium properly, the character pattern in the form of a magnetic latent image in the second record section of the record medium is visualized by using a magnetic latent image-visible image conversion member.

A record medium according to the invention comprises a plate-shaped base, a first magnetic record layer on the base for recording encoded magnetic information, a second magnetic record layer on the base for recording character information, and a magnetic shielding layer formed on the first magnetic record layer and shielding the first magnetic record layer lest magnetic force from the encoded information recorded in the first magnetic record layer leak to the outside.

According to the record medium constructed in this manner, the encoded magnetic information is recorded in the first magnetic record layer, while the character information is recorded as a magnetic latent image in the second magnetic record layer. Because the first record layer is covered by the magnetic shielding member, the encoded information can be prevented from being visualized even when the magnetic latent image is converted into a visible image using a magnetic latent image visualizing means, such as a magnetic viewer.

According to a record medium processing apparatus for processing the record medium of the present invention, the reading means for reading the encoded information recorded in the first magnetic record layer includes generating means for generating magnetic field to magnetically saturate the magnetic shielding layer of the record medium. Although the first magnetic record layer is covered by the magnetic shielding layer, the encoded magnetic information can be read by means of the reading means. In writing the encoded magnetic information in the first magnetic record layer, it is only necessary that the writing means used be able to produce a high enough output to magnetize the magnetic record layer. Because the coercive force of the magnetic record layer is very small, no information can be magnetically recorded in the magnetic shielding member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 13 show an automatic wicket apparatus and a commutation ticket used therein according to a first embodiment of the present invention, in which:

FIG. 1 is a perspective view of the apparatus,

FIG. 2 is a sectional view of the apparatus,

FIG. 3 is a sectional view of a ticket for use in the apparatus,

FIG. 4 is a plan view showing the ticket,

FIG. 5 is a perspective view showing a write head for recording encoded magnetic information and its surroundings, FIG. 6 is a perspective view showing a write head for magnetic latent image recording and its surroundings, FIG. 7 is a perspective view showing an arrangement of the write head for magnetic latent image recording, FIG. 8 is a diagram showing an example of a character-pattern magnetic latent image formed by means of the write head, FIG. 9 is a block diagram schematically showing a control system of the apparatus, FIG. 10 is a sectional view of a magnetic latent image-visible image conversion member, FIG. 11 is a sectional view schematically showing the conversion member placed on a display record section of the ticket, FIG. 12 is a flow charts illustrating a transaction occurring during entrance, FIG. 13 is a flow chart illustrating a transaction occurring during exit.

FIGS. 15 and 16 show a commutation ticket according to a second embodiment of the invention, in which:

FIG. 15 is a sectional view of the ticket, and

FIG. 16 is a plan view of the ticket;

FIGS. 17 and 18 show a commutation ticket according to a third embodiment of the invention, in which:

FIG. 17 is a sectional view of the ticket, and

FIG. 18 is a plan view of the ticket; and

DETAILED DESCRIPTION OF THE PREFERRED EMBODIMENTS

An embodiment in which a record medium processing apparatus according to the present invention is applied to an automatic wicket apparatus will now be described with reference to the accompanying drawings.

Figure 1:
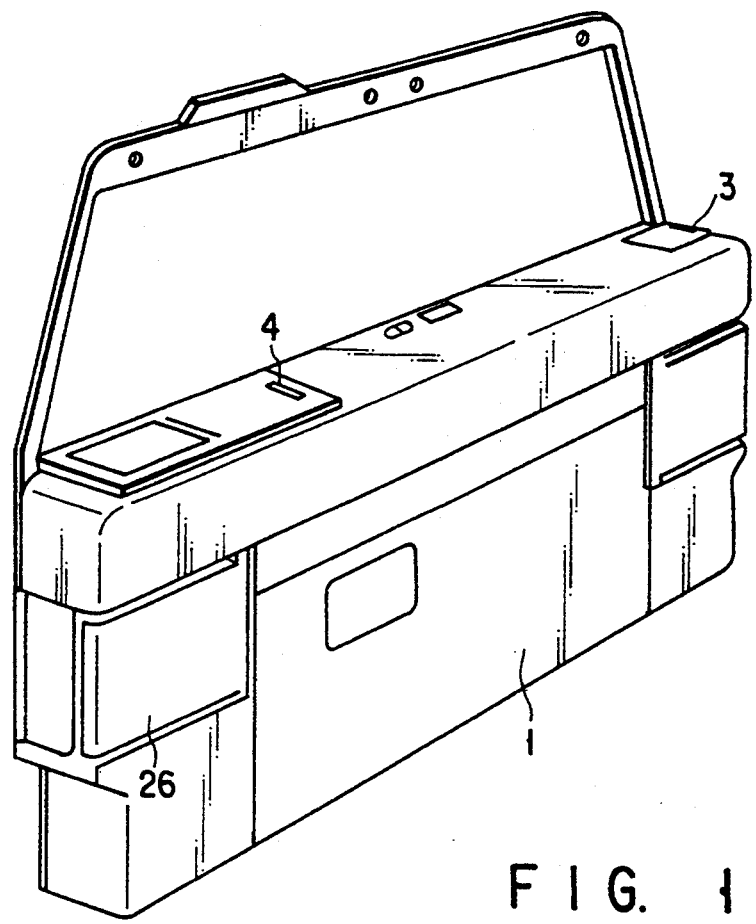
Figure 2:
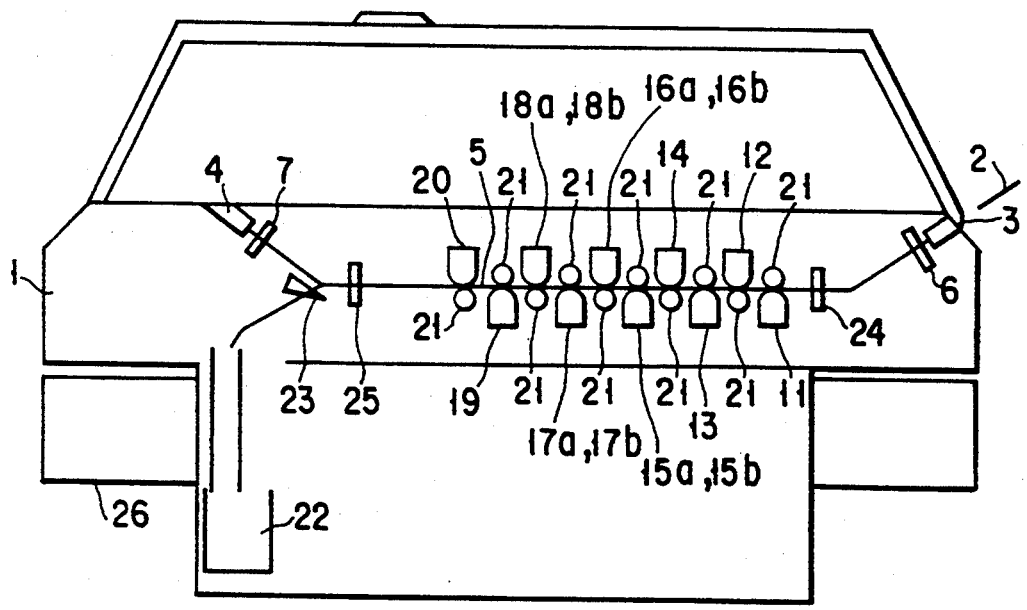

As shown in FIGS. 1 and 2, the automatic wicket apparatus according to the embodiment comprises a housing 1, which has an inlet slot 3 for receiving a passenger ticket such as a commutation ticket 2, for use as a record medium, at one end portion thereof, and an outlet slot 4 for discharging the ticket 2 from the inlet slot 3, at the other end portion.

The automatic wicket apparatus can handle day tickets (passenger tickets), coupon tickets, prepaid cards (money cards), etc., as well commutation tickets. In connection with this embodiment, however, only transactions for the commutation ticket 2 will be described.

Figure 3:
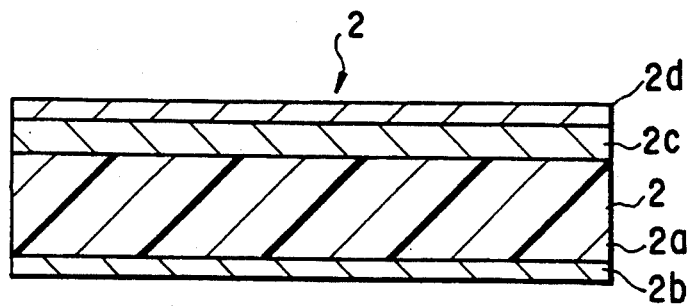

As shown in FIG. 3, the commutation ticket 2 comprises a base 2a, a first magnetic record layer 2b formed on one side (reverse side) of the base 2a, and a second magnetic record layer 2c on the other side of the base. The first layer 2b is used to record encoded versions of fixed information, such as the available section, term of validity, etc., and information for entrance and exit. An image such as a character pattern, is magnetically directly recorded as a magnetic image or magnetic latent image in the second layer 2c.

Formed on the top (obverse side) of the second magnetic record layer 2c is a print layer 2d on which the available section, term of validity, etc. are printed. The layer 2d is an ink-receptive layer, for example. In this case, the heat-transfer recording system is used for printing.

In general, a plastic sheet is used as the base 2a. In this specific case, a polyester sheet of 118-$\mu$m thickness is used. The first magnetic record layer 2b, which is about 6 $\mu$m thick, has a coercive force of about 1.0 to $5.0 \times 10^6/(4\pi) \cdot A/m$, while the second magnetic record layer 2c, which is also about 6 $\mu$m thick, has a coercive force of about 0.3 to $1.0 \times 10^6/(4\pi) \cdot A/m$ and residual magnetic flux of 1.0 to $2.0 \times 10^{-8}$ Wb/cm.

The magnetic latent image on the second magnetic record layer 2c is visualized by means of magnetic particles 43 in a magnetic latent image-visible image conversion member 35, as mentioned later. To attain this, the magnetic particles 43 must be attracted with use of a sufficient residual magnetic flux.

The relationship between the respective coercive forces of the first and second magnetic record layers 2b and 2c is an essential factor. Processing in an automatic wicket system utilizing magnetic commutation tickets is managed by means of the encoded magnetic information recorded in the first magnetic record layer 2b. Therefore, writing the character-form magnetic information in the second magnetic record layer 2c or the presence of the magnetic latent image should be prevented from destroying the encoded magnetic information in the first record layer 2b and from hindering reading operation. The coercive force of the second layer 2c must be smaller than that of the first layer 2b. If the thickness of the commutation ticket, which depends on the thickness of the base 2a, is within a general-use range (up to 220 $\mu$m), the coercive force of the second layer 2c should preferably be one-third that of the first layer 2b or less.

In the present embodiment, the coercive force of the first magnetic record layer 2b is adjusted to $3.0 \times 10^6/(4\pi) \cdot A/m$, and that of the second magnetic record layer 2c to $6.0 \times 10^6/(4\pi) \cdot A/m$. Further, the residual magnetic flux of the second layer 2c is at $1.7 \times 10^{-8}$ Wb/cm.

Figure 4:
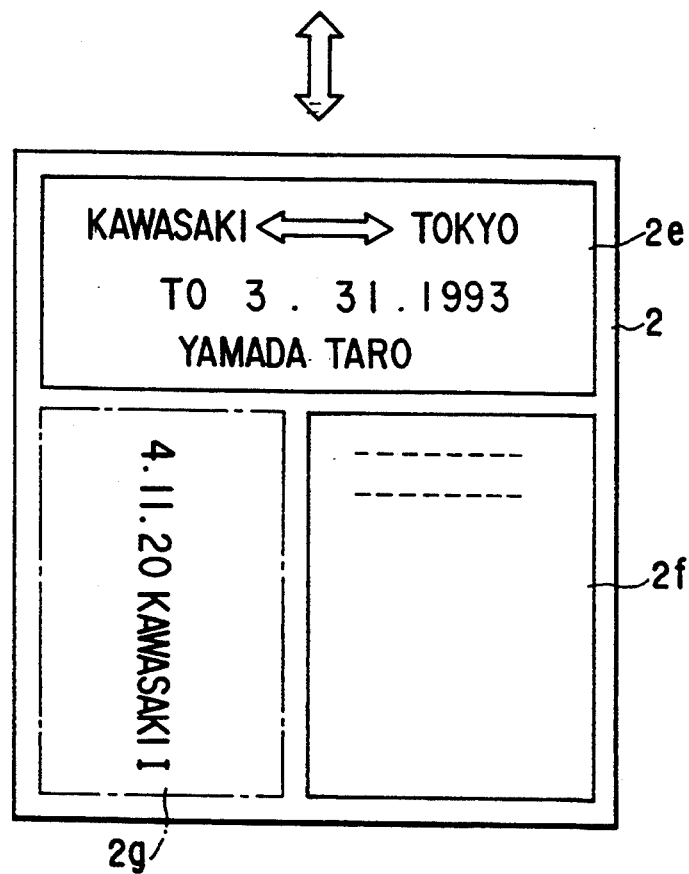

As shown in FIG. 4, the commutation ticket 2 is divided into three parts, a fixed information print section 2e, on which is printed the fixed information including the available section, term of validity, etc., a general print section 2f on which are printed instructions and other remarks, and a display record section 2g. The information for entrance or exit, including the date of entrance, entraining station name, etc. or date of exit, alighting station name, etc., is formed as a magnetic latent image in a character pattern in that portion of the second magnetic record layer 2c which corresponds to the lower part of the display record section 2g. A decorative pattern may be printed on that portion of the print layer 2d which is situated over the record section 2g.

Formed between the inlet and outlet slots 3 and 4, as shown in FIGS. 1 and 2, is a transportation path 5 along which the commutation ticket 2 received through the inlet slot 3 is transported to the outlet slot 4. The inlet slot 3 is provided with a detector 6 for detecting the reception of the ticket 2, and the outlet slot 4 with a detector 7 for detecting the discharge of the ticket 2.

A first magnetic information reading section, first magnetic information recording section, second magnetic information recording section, second magnetic information reading section, and third magnetic information reading section are successively arranged on and along the transportation path 5 which extends from the inlet slot 3 to the outlet slot 4. The first reading section includes an aligning unit (not shown) and read heads 11 and 12, and the first recording section includes write heads 13 and 14. The second recording section includes write heads 15a, 15b, 16a and 16b, while the second reading section includes read heads 17a, 17b, 18a and 18b. Further, the third reading section includes read heads 19 and 20.

The read heads 11 and 12 read the encoded magnetic information recorded in the first magnetic record layer 2b on the reverse of the commutation ticket 2. The head 11 reads the magnetic information when the ticket 2 is transported thereto with the first record layer 2b downward, while the head 12 reads the magnetic information when the ticket 2 is transported with the layer 2b upward.

Figure 5:
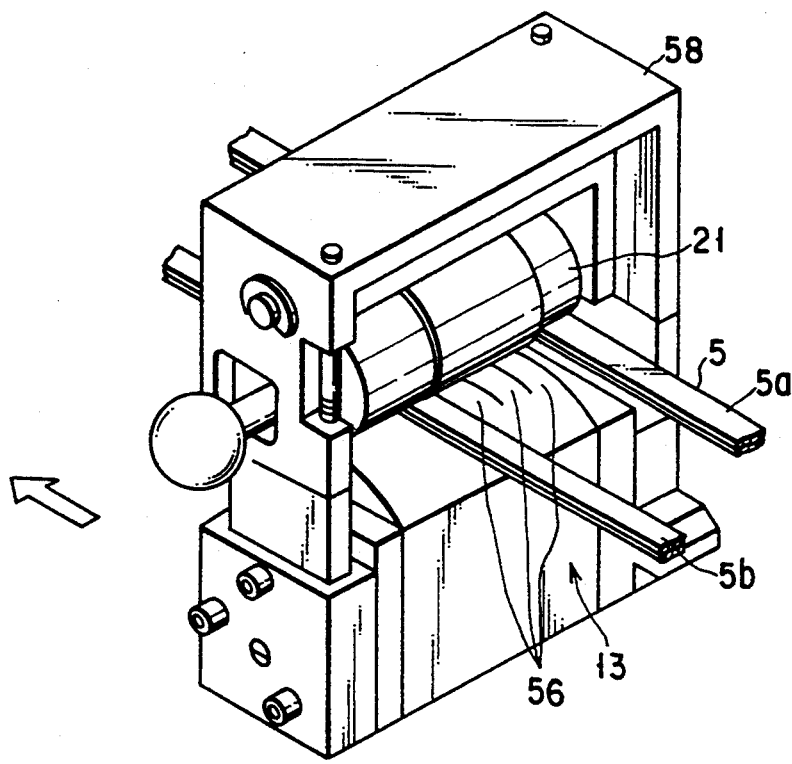

The write heads 13 and 14 record an encoded magnetic information in the first magnetic record layer 2b on the reverse of the commutation ticket 2. The head 13 records the predetermined magnetic information in the record layer 2b when the ticket 2 is transported thereto with the layer 2b downward, while the head 14 records the information when the ticket 2 is transported with the layer 2b upward. As shown in FIG. 5, the write head 13 is provided with a plurality of magnetic heads 56 arranged in a direction perpendicular to the direction of transportation of the ticket 2, and is fixed to a support frame 58. The magnetic heads 56 are arranged at intervals of 2 to 3 mm (first pitch). A pair of conveyor belts 5a and 5b extend through the support frame 58 along the transportation path 5. A feed roller 21 is supported by the frame 58 so as to be in rolling contact with the write head 13. The write head 14 is constructed in like manner.

The write heads 15a, 15b, 16a and 16b record a character pattern (entrance or exit information) in the form of a magnetic latent image in that portion of the second magnetic record layer 2c which corresponds to the display record section 2g on the obverse side of the commutation ticket 2. The heads 15a and 15b are arranged side by side in the direction perpendicular to the transportation direction of the ticket 2. Likewise, the heads 16a and 16b are arranged side by side in the same direction. The head 15a records the magnetic latent image in the second layer 2c under the display record section 2g when the commutation ticket 2 is transported thereto with the record section 2g downward and on the supply side, while the head 15b records the latent image when the ticket 2 is transported with the section 2g downward and on the delivery side. On the other hand, the head 16a records the magnetic latent image in the second layer 2c under the display record section 2g when the ticket 2 is transported thereto with the record section 2g upward and on the supply side, while the head 16b records latent image when the ticket 2 is transported with the section 2g upward and on the delivery side.

Figure 6:
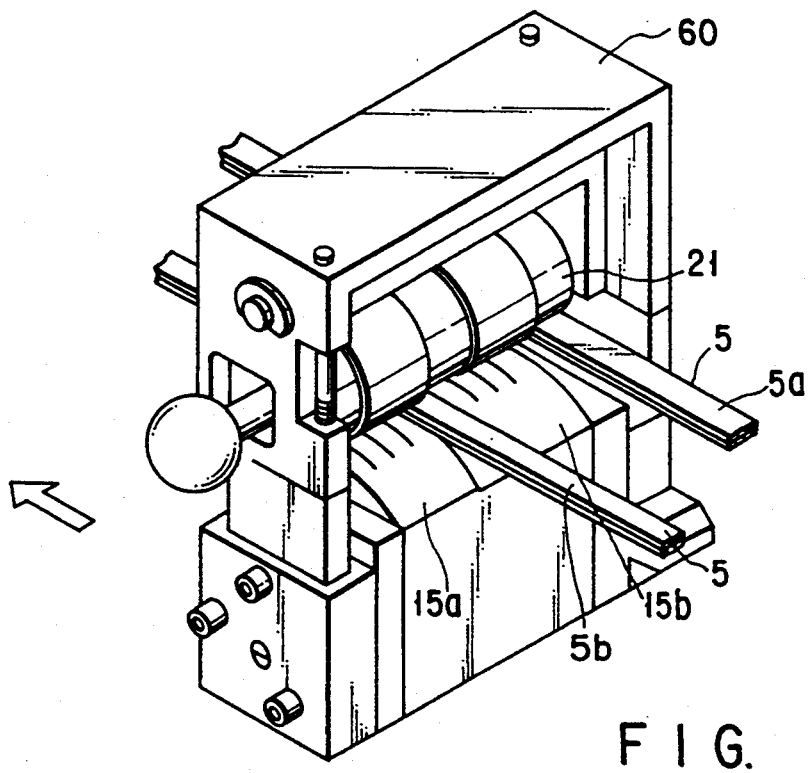

As shown in FIG. 6, the write heads 15a and 15b are fixed side by side on a support frame 60. The paired conveyor belts 5a and 5b extend through the frame 60 along the transportation path 5. Another feed roller 21 is supported by the frame 60 so as to be in rolling contact with the write heads 15a and 15b. The write head 16a and 16b are constructed in like manner.

The read heads 17a, 17b, 18a and 18b read part or whole of the character pattern recorded in the second layer 2c of the commutation ticket 2. The head 17a reads the character pattern from the second layer 2c when the ticket 2 is transported thereto with the record section 2g downward and on the supply side, while the head 17b reads the character pattern when the ticket 2 is transported with the section 2g downward and on the delivery side. On the other hand, the head 18a reads the character pattern from the second layer 2c the display record section 2g when the ticket 2 is transported thereto with the record section 2g upward and on the supply side, while the head 18b reads the character pattern when the ticket 2 is transported with the section 2g upward and on the delivery side.

The read heads 19 and 20 read the encoded magnetic information recorded by the write heads 13 and 14. React head 19 reads the magnetic information from the first magnetic record layer 2b when the commutation ticket 2 is transported thereto with the first record layer 2b downward, while read head 20 reads the magnetic information when the ticket 2 is transported with the layer 2b upward.

A plurality of feed rollers 21, which are arranged along the transportation path 5, are in rolling contact with the read heads 11, 12, 17a, 17b, 18a, 18b, 19 and 20 and the write heads 13, 14, 15a, 15b, 16a and 16b with the path 5 defined between them.

A distribution unit 23 is located at the terminal end portion of the transportation path 5. The unit 23 directs the received commutation ticket 2 to the outlet slot 4 if the ticket 2 is one to be discharged, and directs the ticket 2 to a ticket collecting section 22 if the ticket 2 is one to be recovered.

Detectors 24 and 25 for detecting the passage of the inserted commutation ticket 2 are arranged on the transportation path 5. Further, the automatic wicket apparatus housing 1 is provided with a swingable door unit 26 which prevents a user's passage when closed.

Figures 7, 8:
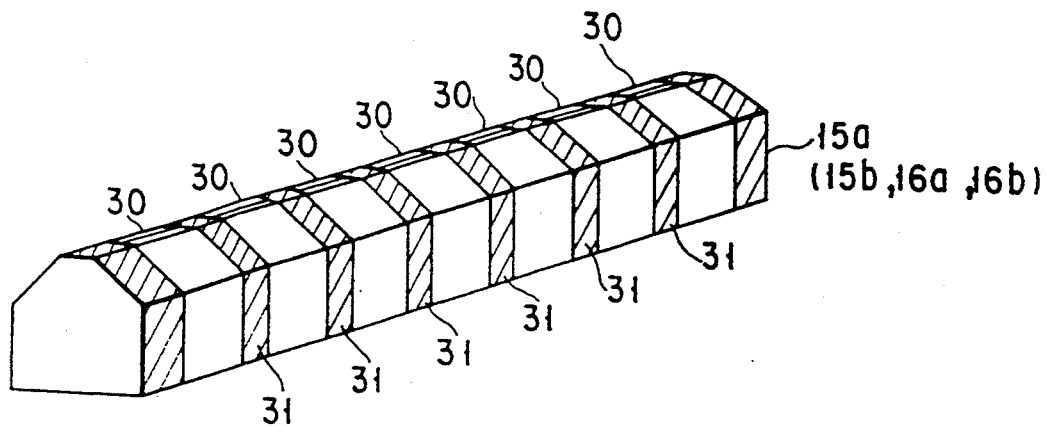

As shown in FIG. 7, the write head 15a includes seven head portions 30 which are arranged at right angles to the transportation path 5. These head portions are spaced at intervals of about 1 mm (second pitch) by means of spacers 31. Thus, the write head 15a can form a magnetic latent image in a character pattern of 7-mm width on that portion of the second magnetic record layer 2c which corresponds to the display record section 2g of the commutation ticket 2.

At the time of entrance, for example, the date of entrance, entraining station name, and symbol I indicative of entrance are magnetically recorded in a line "NOV. 20, 1992 KAWASAKI I." At the time of exit, the date of exit, alighting station name, and symbol O indicative of exit are magnetically recorded in a line "NOV. 20, 1992 KAWASAKI O."

Referring now to FIG. 8, the formation of a latent character image will be described. FIG. 8 shows a latent image of the character "A" (hatched portion). The write head 15a shown in FIG. 7 is moved relative to the ticket 2 in the direction of the arrow of FIG. 8 to start recording the magnetic latent image. First, when the head 15a is on line La, the head portions 30 corresponding to the first through third columns are driven, and the polarity of the corresponding matrix sections are N—N. When the head 15a is then in line Lb, the head portions 30 corresponding through the third to fifth columns are driven, and the polarities of sections Lb, C3-Lb, C5 are S—S, respectively. When the write head 15a is advanced to line Lc as the head portions 30 corresponding to the columns tracing the character "A" are driven for the individual lines, the polarity of the region (hatched portion) corresponding to the character "A" becomes N—N or S—S, and the magnetic latent image is formed. In this case, the latent image is formed as a character pattern in a 5-by-7 matrix.

Figure 9:
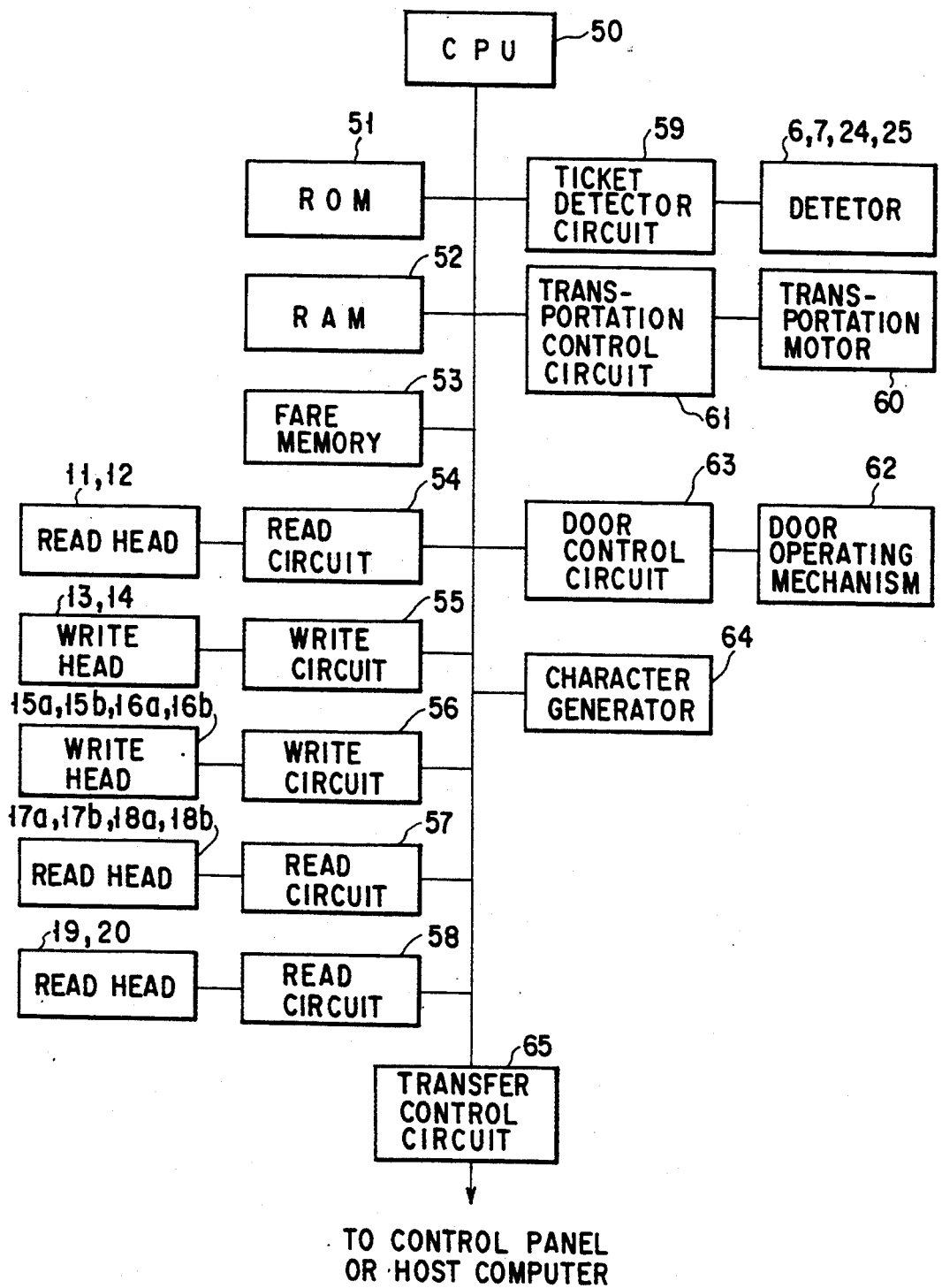

As shown in FIG. 9, a control system of the automatic wicket apparatus constructed in this manner comprises a CPU 50 for controlling the whole wicket apparatus; a ROM 51 stored with a control program for the CPU 50; a RAM 52 for storing reference information, such as name (code) of the station in which the automatic wicket apparatus is arranged and the present date, used for decision of the availability of the commutation 2, information read from the commutation ticket 2, and information as a buffer for the control program; and a fare memory 53 applicable to day tickets or prepaid cards and stored with fare information corresponding to the entraining stations at which use of the day tickets or prepaid cards is started (or entraining station codes corresponding to the entraining stations). The control system further comprises a read circuit 54 for controlling the read heads 11 and 12, a write circuit 55 for controlling the write heads 13 and 14, a write circuit for controlling the write heads 15a, 15b, 16a and 16b, a read circuit 57 for controlling the read heads 17a, 17b, 18a and 18b, and a read circuit 58 for controlling the read heads 19 and 20. Furthermore, the control system comprises a commutation ticket detector circuit 59 for detecting the transportation of the commutation ticket 2 in accordance with the respective outputs of the detectors 6, 7, 24 and 25, a transportation control circuit 61 for controlling a transportation motor 60 used to transport the ticket 2 along the transportation path 5, a door control circuit 63 for controlling a door operating mechanism 62 used to drive the door unit 26, a character generator 64 for generating character patterns corresponding to character codes, and a transfer control circuit 65 for the transfer of information to and from a control panel (not shown) or host computer for controlling the automatic wicket apparatus.

The following is a description of the magnetic latent image-visible image conversion member 35 which is used to visualize the magnetic latent image recorded in that portion of the second magnetic record layer 2c which is under the display record section 2g of the commutation ticket 2 when the ticket 2 is returned as a suspicious one.

Figure 10:
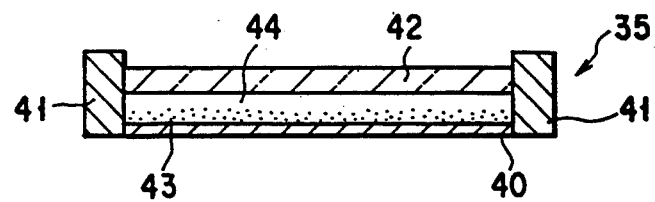

As shown in FIG. 10, the conversion member 35 includes a rectangular sheet 40 and a glass cover 42 which are equivalent in size to the display record section 2g. The sheet 40 and the cover 42 are fixed to a rectangular frame 41 in a manner such that they are spaced from each other. The magnetic particles 43 are sealed in a closed space 44 which is defined by the sheet 40, frame 41, and cover 42. The closed-space-side surface of the sheet 40 is whitened.

The sheet 40 is formed of a magnetically permeable material, e.g., permeable metal such as iron or iron-based alloy, plastic sheet, etc. In the present embodiment, a polyester sheet of 25-μm thickness is used as the sheet 40.

Figure 11:
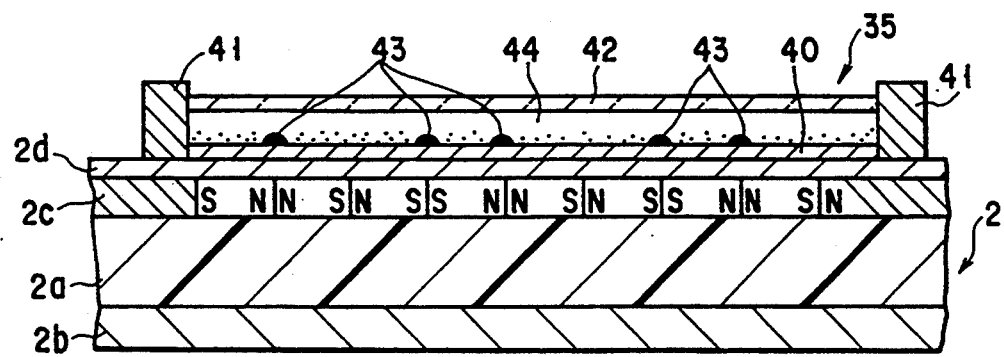

If the commutation ticket 2 is discharged from the automatic wicket apparatus because the current entrance information or preceding exit information is suspected to be improper during entrance through the apparatus, the entrance or exit information is checked by visualizing the magnetic latent image recorded in the display record section 2g. In this case, the conversion member 35 is put on that portion of the second magnetic record layer 2c which corresponds to the record section 2g of the commutation ticket 2, as shown in FIG. 11, and the ticket 2 and the conversion member 35 are softly shaken together.

Thereupon, magnetic lines of force act on the magnetic particles 43 of the conversion member 35 in positions where the polarity is inverted like N—N or S—S. By this action, the magnetic particles 43 are collected in these positions, thus forming magnetic particle dots. The dots of the magnetic particles 43 are formed corresponding to the magnetic latent image in the character pattern shown in FIG. 8. The user of the commutation ticket 2 can identify the character pattern corresponding to the magnetic latent image recorded in the second magnetic record layer 2c which faces the display record section 2g, or check the character pattern, by observing the dots through the glass cover 42 of the conversion member 35.

Suspicion will be aroused at the time of exit if the date of entrance for the day and the entraining station information conforming to the available section are not recorded in the first magnetic record layer 2b. Also, suspicion will be aroused at the time of entrance if the preceding alighting station information is not recorded in the record layer 2b.

The following is a description of wicket transactions for the commutation ticket 2 arranged in this manner.

Figure 12:
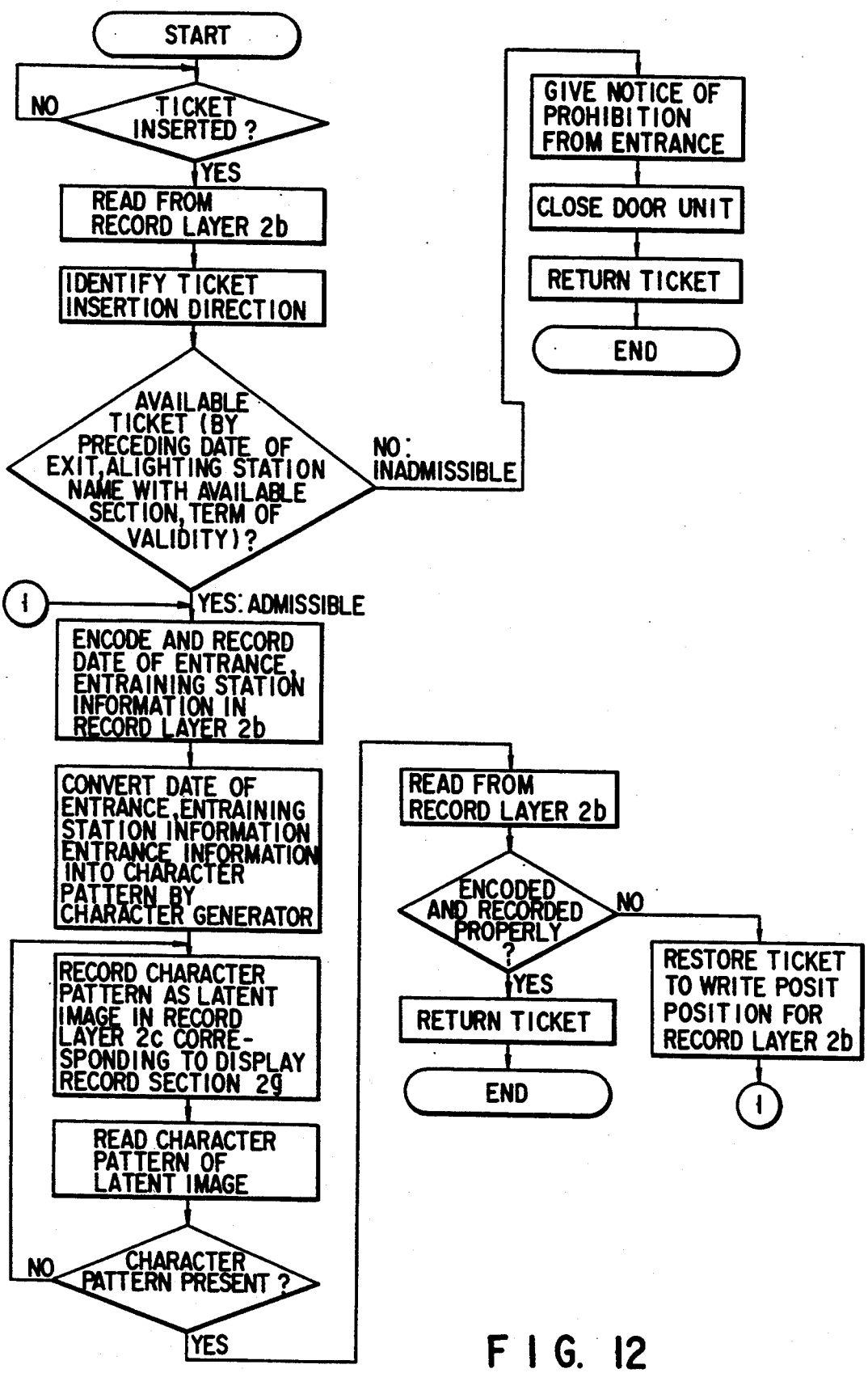

Referring first to the flow chart of FIG. 12, a transaction for entrance will be described. If the user inserts the commutation ticket 2 into the inlet slot 3, for example, a detection signal from the detector 6 is delivered to the CPU 50. Thereupon, the CPU 50 discriminates the insertion of the ticket 2, and causes the transportation motor 60 to drive the conveyor belts 5a and 5b, feed rollers 21, etc. As a result, the ticket 2 is introduced into the apparatus through the inlet slot 3, and transported on the transportation path 5.

The introduced commutation ticket 2 is aligned by the aligning unit (not shown), and then reaches the read heads 11 and 12. If the ticket 2, in doing this, is held with its reverse or the first magnetic record layer 2b downward, encoded magnetic record contents are read by means of the read head 11, and delivered to the CPU 50. If the reverse of the ticket 2 or the record layer 2b faces upward, on the other hand, the encoded record contents are read by means of the read head 12, and delivered to the CPU 50.

Based on the contents read by means of the read head 11 or 12, the CPU 50 discriminates the direction of insertion of the commutation ticket 2. More specifically, it is determined whether the first magnetic record layer 2b of the ticket 2 faces upward or downward, whether the display record section 2g of the ticket 2 faces upward or downward, and whether the record section 2g is situated on the supply side or delivery side, for example. Based of this decision, the CPU 50 selects the read and write heads in the subsequent stages.

When the commutation ticket 2 is inserted with the display record section 2g upward and on the supply side, for example, the magnetic latent image of the character pattern is recorded in the second layer 2c under the record section 2g by the write head 16a.

Based on the contents read by means of the read head 11 or 12, that is, the available section, term of validity, preceding date of exit, and preceding alighting station, the CPU 50 determines whether or not the commutation ticket 2 permits entrance. If it is concluded that the ticket 2 permits entrance, the CPU 50 allows the write head 13 or 14 to update the encoded record contents in the first magnetic record layer 2b of the ticket 2. Thus, encoded magnetic information for the date of entrance through the automatic wicket apparatus and the entraining station is recorded in the first record layer 2b of the ticket 2.

Subsequently, the CPU 50 causes the character generator 64 to convert the date of entrance, encoded magnetic information (character code) for the entraining station, and information indicative of entrance into a character pattern. Then, the CPU 50 causes one of the write heads 15a, 15b, 16a and 16b, which corresponds to the decision on the direction of insertion of the commutation ticket 2, to form a magnetic latent image of the character pattern on that portion of the second magnetic record layer 2c which is opposed to the display record section 2g of the ticket 2. As the entrance information, for example, "NOV. 20, 1992 KAWASAKI I," which is indicative of an entrance at Kawasaki Station on Nov. 20, 1992, is recorded in the form of a magnetic latent image.

Thereafter, some of the record contents in the second magnetic record layer 2c corresponding to the display record section 2g of the commutation ticket 2 are read by means of one of the read heads 17a, 17b, 18a and 18b which corresponds to the decision on the direction of insertion of the ticket 2, and are supplied to the CPU 50. Thereupon, the CPU 50 checks to see if the magnetic latent image of the character pattern is properly recorded in the commutation ticket 2.

If the result of this check is positive, the updated record contents in the first magnetic record layer 2b of the commutation ticket 2 are read by means of the read head 19 or 20, and are supplied to the CPU 50. Thereupon, the CPU 50 checks to see if the data recorded in the commutation ticket 2 are proper. If the result of this check is positive, the ticket 2 is discharged through the outlet slot 4 with the door unit 26 left open so that the user is allowed to pass. Then, the user gets through the apparatus, and receives the ticket 2.

If the CPU 50 suspects the authenticity of the commutation ticket 2 and prohibits the user's entrance, a display section (not shown) of the apparatus displays a notice to the effect that the entrance is prohibited, the door unit 26 is closed, and the ticket 2 is discharged through the outlet slot 4. In this case, a system manager may be informed of the situation by means of a buzzer (not shown).

If the character pattern fails to be properly recorded on that portion of the second magnetic record layer 2c which corresponds to the display record section 2g of the commutation ticket 2, moreover, recording the magnetic latent image of the pattern is started again after returning the ticket 2 to that one of the write heads 15a, 15b, 16a and 16b which corresponds to the decision on the direction of insertion of the ticket 2.

If the record contents in the first magnetic record layer 2b of the commutation ticket 2 are improper, recording the encoded information is started again after returning the ticket 2 to the write head 13 or 14 which corresponds to the decision on the direction of insertion of the ticket 2.

Figure 13:
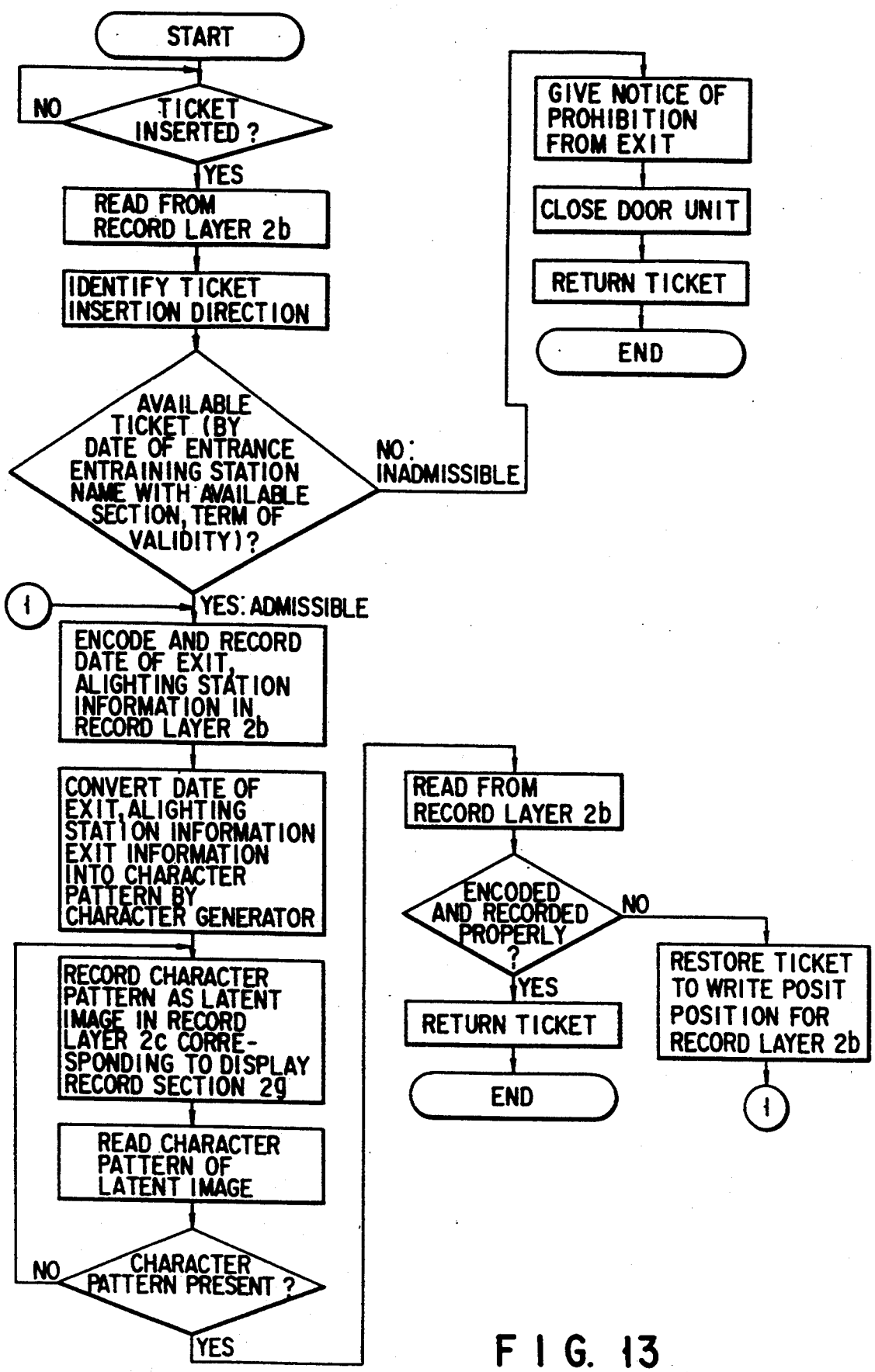

Referring now to the flow chart of FIG. 13, a transaction for exit will be described. If the user inserts the commutation ticket 2 into the inlet slot 3, for example, a detection signal from the detector 6 is delivered to the CPU 50. Thereupon, the CPU 50 discriminates the insertion of the ticket 2, and causes the transportation motor 60 to drive the conveyor belts 5a and 5b, feed rollers 21, etc. As a result, the ticket 2 is introduced into the apparatus through the inlet slot 3, and transported on the transportation path 5.

The commutation ticket 2, introduced through the inlet slot 3, is aligned by the aligning unit (not shown), and then reaches the read heads 11 and 12. If the ticket 2, in doing this, is held with its reverse or the first magnetic record layer 2b downward, the encoded magnetic record contents are read by means of the read head 11, and delivered to the CPU 50. If the reverse of the ticket 2 or the record layer 2b faces upward, on the other hand, the encoded record contents are read by means of the read head 12, and delivered to the CPU 50.

Based on the contents read by means of the read head 11 or 12, the CPU 50 discriminates the direction of insertion of the commutation ticket 2. Based of this decision, the CPU 50 selects the read and write heads in the subsequent stages. When the ticket 2 is inserted with the display record section 2g upward and on the supply side, for example, the magnetic latent image of the character pattern is recorded by the write head 16a.

By comparing the code of the station and the present date as reference information stored in the RAM 52 with the contents read by means of the read head 11 or 12, that is, the available section, term of validity, date of entrance, and entraining station, the CPU 50 determines whether or not the commutation ticket 2 permits exit. Specifically, based on the reference information in the RAM 52 and the information recorded in the ticket 2, when the code of the station is in the available section of the ticket 2 and the present data is in the term of validity of the ticket, the CPU 50 decides that the ticket 2 is available. On the other hand, if not so, the CPU 50 decides that the ticket 2 is avoidable.

If it is concluded that the ticket 2 permits exit, the CPU 50 allows the write head 13 or 14 to update the encoded record contents in the first magnetic record layer 2b of the ticket 2. Thus, encoded information for the date of exit through the automatic wicket apparatus and the alighting station is recorded in the first record layer 2b of the ticket 2.

Subsequently, the CPU 50 causes the character generator 64 to convert the date of exit, encoded information (character code) for the alighting station, and information indicative of exit into a character pattern. Then, the CPU 50 causes one of the write heads 15a, 15b, 16a and 16b, which corresponds to the decision on the direction of insertion of the commutation ticket 2, to form a magnetic latent image of the character pattern on that portion of the second magnetic record layer 2c which is opposed to the display record section 2g of the ticket 2. As the exit information, for example, "NOV. 20, 1992 TOKYO O," which is indicative of an exit at Tokyo Station on Nov. 20, 1992, is recorded in the form of a magnetic latent image.

Thereafter, some of the record contents in the second magnetic record layer 2c corresponding to the display record section 2g of the commutation ticket 2 are read by means of one of the read heads 17a, 17b, 18a and 18b which corresponds to the decision on the direction of insertion of the ticket 2, and are supplied to the CPU 50. Thereupon, the CPU 50 checks to see if the magnetic latent image of the character pattern is properly recorded in the commutation ticket 2.

If the result of this check is positive, the record contents in the first magnetic record layer 2b of the commutation ticket 2 are read by means of the read head 19 or 20, and are supplied to the CPU 50. Thereupon, the CPU 50 checks to see if the data recorded in the commutation ticket 2 are proper. If the result of this check is positive, the ticket 2 is discharged through the outlet slot 4 with the door unit 26 left open so that the user is allowed to pass. Then, the user gets through the apparatus, and receives the ticket 2.

If the CPU 50 suspects the authenticity of the commutation ticket 2 and prohibits the user's exit, the display section (not shown) of the apparatus displays a notice to the effect that the exit is prohibited, the door unit 26 is closed, and the ticket 2 is discharged through the outlet slot 4. In this case, a system manager may be informed of the situation by means of the buzzer (not shown).

If the character pattern fails to be properly recorded on that portion of the second magnetic record layer 2c which corresponds to the display record section 2g of the commutation ticket 2, moreover, recording the magnetic latent image of the pattern is started again after returning the ticket 2 to that one of the write heads 15a, 15b, 16a and 16b which corresponds to the decision on the direction of insertion of the ticket 2.

If the record contents in the first magnetic record layer 2b of the commutation ticket 2 are improper, recording the encoded information is started again after returning the ticket 2 to the write head 13 or 14 which corresponds to the decision on the direction of insertion of the ticket 2.

Figure 14:
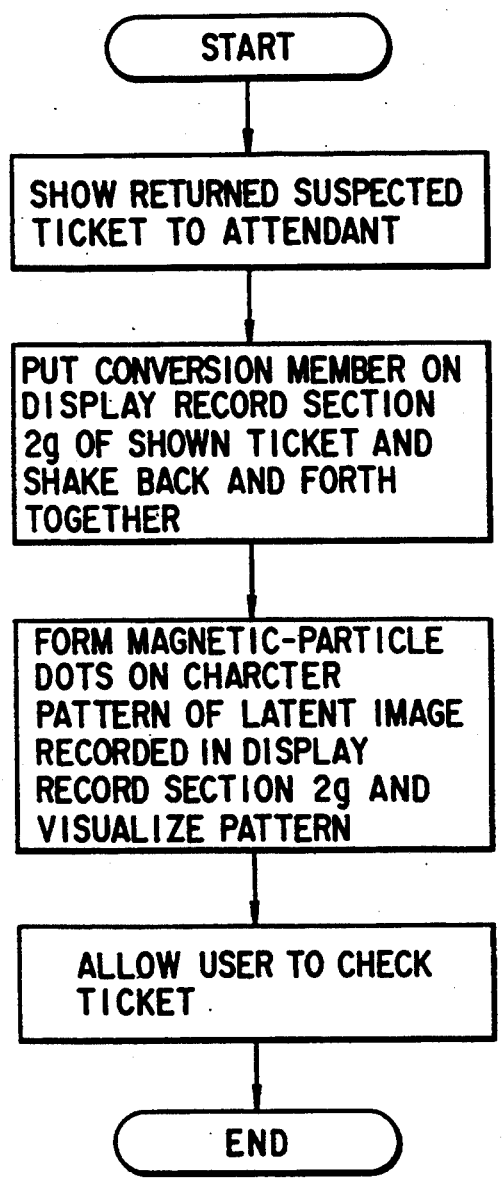
FIG. 14 is a flow chart illustrating a visualizing process for the character pattern of the magnetic latent image.

Referring now to the flow chart of FIG. 14, a process for visualizing the character pattern recorded as a magnetic latent image in the commutation ticket 2, in case of suspicion at the time of entrance or exit, will be described.

If a suspicion is aroused at the time of entrance or exit such that the user's entrance or exit is prohibited, the user, having received the returned commutation ticket 2, is expected to go to an attended gate and hand the ticket 2 to the system manager. On receiving the suspicious ticket 2, the manager puts the magnetic latent image-visible image conversion member 35 on that portion of the second magnetic record layer 2c which corresponds to the record section 2g of the ticket 2, as shown in FIG. 11, and softly shakes the ticket 2 and the conversion member 35 together.

Thereupon, magnetic lines of force act on the magnetic particles 43 of the conversion member 35 in positions where the polarity is inverted like N—N or S—S. By this action, the magnetic particles 43 are collected in these positions, thus forming toner dots. The dots of the magnetic particles 43 are formed corresponding to the magnetic latent image in the character pattern, as shown in FIG. 8. The user of the commutation ticket 2 can identify the magnetic latent image recorded in the second magnetic record layer 2c which faces the display record section 2g, or check the latent image for presence, by observing the dots through the glass cover 42 of the conversion member 35.

Thus, if a character pattern corresponding to the entrance information is not visualized on the display record section 2g, or if a character pattern corresponding to entrance or exit information for another date or the like is visualized, at the time of exit, then an illegal ride is exposed. If a character pattern corresponding to the preceding exit information is not visualized on the record section 2g, or if a character pattern corresponding to entrance information for another date or the like is visualized, at the time of entrance, moreover, an illegal ride is exposed.

According to a conventional arrangement, a commutation ticket is inserted into a magnetic medium reader or other device, and magnetic information is read in the device and displayed on a display unit for a user's reference. In the above-described automatic wicket system utilizing commutation tickets according to the present invention, in contrast with this, the user can be convinced that the information written in the ticket precisely corresponds to the visualized image. In case entrance or exit is prohibited on account of suspicion, a suspected illegal ride can be recognized on the commutation ticket shown by the user.

The durability of repetitive display of the character pattern on the display record section 2g is equivalent to that of the magnetic record layers, and the commutation ticket, which requires a high repetitive display durability, can enjoy a satisfactory durability.

Since the recording in that portion of the second magnetic record layer 2c which corresponds to the display record section 2g can be effected at the same speed as the recording in the first magnetic record layer 2b, the processing speed can be improved considerably as compared with the case of a system for reversible thermal recording. Unlike the conventional case using toner, moreover, the commutation ticket according to the invention dispenses with a space or the like which lowers the mechanical strength. Thus, the commutation ticket can enjoy a high mechanical strength, so that the reliability of the system can be improved.

The encoded information recorded in the first magnetic record layer 2b is identified after the magnetic latent image is recorded in the second magnetic record layer 2c. If the record contents in the first record layer 2b are destroyed as the magnetic latent image is formed in the second record layer 2c, therefore, the information can be recorded again in the first record layer 2b in accordance with the record contents in the second record layer 2c. Thus, the recording in the first magnetic record layer 2b can be ensured.

According to the embodiment described above, there may be provided an automatic wicket apparatus in which suspicious contents, if any, can be displayed on a record medium, such as a commutation ticket, so that a user of the record medium can recognize the contents when prohibited from entrance or exit, the ticket enjoying a high repetitive record durability, shorter processing time, and satisfactory mechanical strength.

Figure 15:
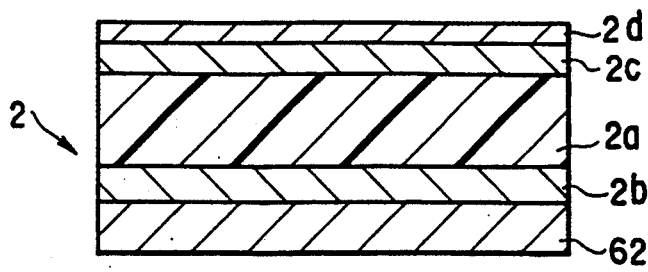
Figure 16:
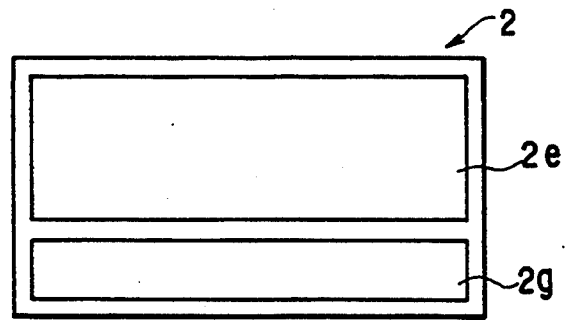

FIGS. 15 and 16 show another commutation ticket 2 for use as a record according to a second embodiment of the present invention.

The commutation ticket 2 comprises a base 2a, a first magnetic record layer 2b formed on one side (lower surface as illustrated) of the base 2a, a magnetic shielding layer 62 on the layer 2b, a second magnetic record layer 2c for display on the other side (upper surface as illustrated) of the base 2a, a print layer 2d on the layer 2c.

In general, a plastic sheet is used as the base 2a. In this specific case, a polyester sheet of 188-$\mu$m thickness is used for the purpose.

The first magnetic record layer 2b has a thickness of about 6 $\mu$m and a coercive force of about 1.0 to $5.0 \times 10^6/(4\pi)$·A/m. The first layer 2b is used to record encoded versions of fixed information, such as the available section, term of validity, etc., and information for entrance and exit.

The magnetic shielding layer 62 which is formed of a soft magnetic material, has a thickness of about 10 $\mu$m and a coercive force of about $5.0 \times 10^4/(4\pi)$·A/m.

The second magnetic record layer 2c, which is a layer for recording a magnetic latent image of a character pattern, has a thickness of about 6 $\mu$m, coercive force of 0.3 to $1.0 \times 10^6/(4\pi)$·A/m, and residual magnetic flux of 1.0 to $2.0 \times 10^{-8}$ Wb/cm. As in the case of the foregoing embodiment, the magnetic latent image on the record layer 2c is visualized by means of magnetic particles in the magnetic latent image-visible image conversion member 35. To attain this, the magnetic particles must be attracted with use of a sufficient residual magnetic flux.

The print layer 2d, which is used to record the available section, term of validity, user's name, etc., is an ink-receptive layer, for example. The data are recorded on this layer by using a heat-transfer recording device.

For example, the first and second magnetic record layers 2b and 2c have coercive forces of about $3.0 \times 10^6/(4\pi)$·A/m and $0.6 \times 10^6/(4\pi)$·A/m, respectively.

As shown in FIG. 16, the print layer 2d is divided into two parts, a fixed information print section 2e, on which is printed the fixed information including the available section, term of validity, etc., and a display record section 2g. The information for entrance or exit, including the date of entrance, entraining station name, etc. or date of exit, alighting station name, etc., is formed as a magnetic latent image in a character pattern in that portion of the second magnetic record layer 2c which corresponds to the display record section 2g.

If the commutation ticket 2 is suspected of being improper during entrance or exit through the automatic wicket apparatus using the ticket 2, the magnetic latent image-visible image conversion member 35 is held against the obverse or print-layer-side surface of the ticket 2. Thus, the magnetic latent image recorded on that portion of the second magnetic record layer 2c, which is opposed to the display record section 2g, is visualized by means of the magnetic particles in the conversion member 35. At this time, the encoded information in the magnetic record layer 2b, which requires security, cannot be visualized since the base 2a serves as a magnetic shielding layer.

Further, the surface of the first magnetic record layer 2b, which is used to encode and record the fixed information including the available section, term of validity, etc. or the information for entrance or exit, is covered by the magnetic shielding layer 62. Even though the conversion member 35 is held against the reverse of the commutation ticket 2, therefore, magnetic lines of force from the magnetic latent image are screened by the shielding layer 62, and never emerges from the shielding layer surface. Thus, the security of the encoded magnetic information recorded in the first magnetic record layer 2b can be maintained.

Figure 17:
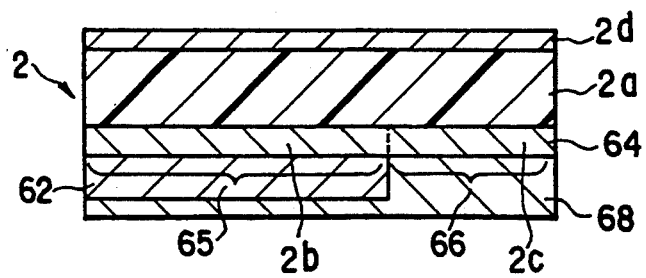
Figure 18:
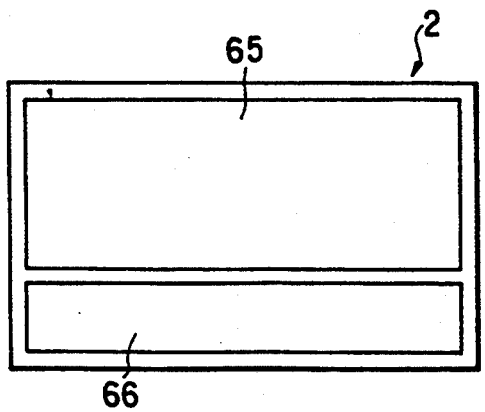

FIGS. 17 and 18 show still another commutation ticket 2 for use as a record medium according to a third embodiment of the present invention.

This commutation ticket 2 comprises a print layer 2d which is formed on one side (upper surface as illustrated) of a base 2a. The print layer 2d, which is used to record the available section, term of validity, user's name, etc., is an ink-receptive layer based on the heat-transfer recording system, for example.

Formed on the other side (lower surface as illustrated) of the base 2a, moreover, is a magnetic record layer 64 which combines a first magnetic record layer 2b for recording encoded information and a second magnetic record layer 2c for display for recording a magnetic latent image in the form of a character pattern. The record layer 64 is a high-coercivity magnetic film having a thickness of about 6 µm and a coercive force of $3 \times 10^6/(4\pi) \cdot A/m$.

Further, a magnetic shielding layer 62 is put on the magnetic record layer 64 so as to cover the first magnetic record layer 2b. The shielding layer 62, which should suitably be a high-permeability, low-coercivity layer, has a thickness of about 10 µm and a coercive force of $5.0 \times 10^4/(4\pi) \cdot A/m$.

Furthermore, a pre-print layer 68, which is printed with various instructions and the like, is formed so as to cover the second magnetic record layer 2c for display, and the magnetic shielding layer 62. As shown in FIG. 18, the pre-print layer 68 is divided into two parts, opposed individually to the second magnetic record layer 2c, on which the magnetic latent image of the character pattern is formed, and the first magnetic record layer 2b for recording the encoded magnetic information.

In the commutation ticket 2 according to the third embodiment constructed in this manner, both the first and second magnetic record layers 2b and 2c are formed only on the other side of the base 2a, so that the overall thickness of the ticket can be reduced.

If the magnetic record layer is formed on each side of the base 2a, a magnetic latent image recorded on the other side may possibly interfere with magnetic information being read. To avoid this, increasing the thickness of the base 2a or other countermeasure is required. If the base 2a is too thick, the commutation ticket cannot be easily bent, so that it must be transported without being bent, thus requiring a long transportation path. Also, various record heads must be brought into contact with the ticket surface under severe conditions. Thus, there may be aroused some problems on the arrangement or reliability of the apparatus.

According to the third embodiment, the two magnetic record layers 2b and 2c are arranged side by side on one side of the commutation ticket 2, so that the magnetic information can be read without interference. Thus, the thickness of the base 2a need not be changed. Even in the case where the magnetic latent image-visible image conversion member 35 is opposed to the first magnetic record layer 2b, as well as the record layer 2c beside it, in order to visualize the magnetic latent image formed on the record layer 2c, magnetic lines of force from the encoded magnetic information recorded in the record layer 2b are screened by the magnetic shielding layer 62, and never emerges from the surface of the preprint layer 68. Since magnetic lines of force from the magnetic latent image on the magnetic record layer 2c which is not covered by the shielding layer 62 get out of the pre-print layer 68, on the other hand, the latent image can be visualized by means of the suitable conversion member 35. Thus, the security of the encoded magnetic information recorded in the magnetic record layer 2b can be maintained.

The automatic wicket apparatus for processing the commutation tickets according to the second and third embodiments with the above arrangement is constructed substantially in the same manner as the apparatus according to the first embodiment. The following is a description of only differences between these embodiments. In the commutation tickets 2 of the second and third embodiments, the first magnetic record layer 2b is covered by the magnetic shielding layer 62. Accordingly, magnetic lines of force from the magnetic information recorded in the first record layer 2b are confined within the shielding layer 62, so that the magnetic information cannot be read directly.

Figure 19:
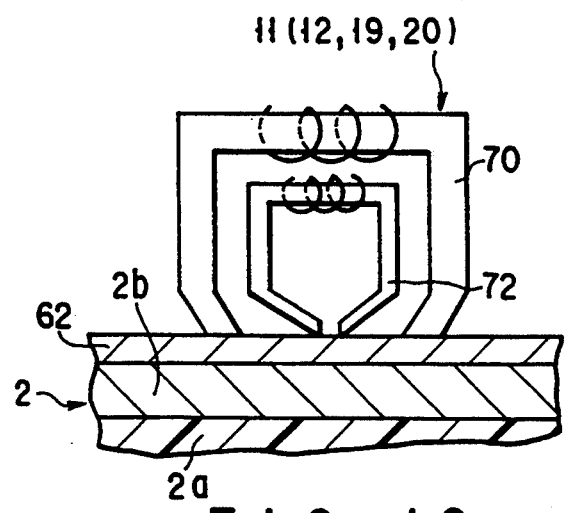
FIG. 19 is a view schematically showing a magnetic head used in a processing apparatus for the commutation tickets according to the second and third embodiments.

Thereupon, each of the magnetic heads which individually constitute the read heads 11, 12, 19 and 20 of the automatic wicket apparatus has a dual structure, including a first head 70 for use as a saturation magnetism generating member, formed of a permanent magnet or electromagnet for magnetically saturating the magnetic shielding member 62, and a second head 72 for use as a reading member for reading the encoded magnetic information recorded in the first magnetic record layer 2b, as shown in FIG. 19.

In reading the encoded magnetic information by using each read head constructed in this manner, the encoded magnetic information is read from the first magnetic record layer 2b by means of the second head 72 with the magnetic shielding member 62 magnetically saturated by means of the first head 70.

Since the write heads used to write the encoded magnetic information in the first magnetic record layer 2b can produce a high enough output to magnetize the record layer 2b, they need not have a dual structure. In writing the information, moreover, the magnetic information cannot be recorded in the magnetic shielding member 62 since the coercive force of the layer 62 is very small. Since the second magnetic record layer 2c is not covered by the shielding member 62, furthermore, normal magnetic heads can be used to write in and read the magnetic latent image from the layer 2c.

According to the commutation ticket constructed in this manner, the first magnetic record layer in which the encoded magnetic information is recorded is covered by the magnetic shielding member, so that the encoded magnetic information cannot be visualized even with use of the magnetic latent image-visible image conversion member, such as a magnetic viewer, and only the magnetic information for display can be visualized. Thus, the security of the commutation ticket can be maintained. In the automatic wicket apparatus for processing the commutation ticket, moreover, each read head has a dual structure, including the saturation magnetism generating member for saturating the magnetic shielding member of the ticket, so that it can read the encoded magnetic information written in the magnetic record layer. In writing the encoded magnetic information in the magnetic record layer, moreover, the writing means must only be able to produce a high enough output to magnetize the record layer. In doing this, the magnetic information cannot be recorded in the magnetic shielding member since the coercive force of the magnetic shielding member is very small. Thus, the information can be recorded only in the magnetic record layer.

It is to be understood that the present invention is not limited to the embodiments described above, and that various changes and modifications may be effected therein by one skilled in the art without departing from the scope or spirit of the invention.

In the first embodiment, for example, the display record section is located in the lower left portion of the commutation ticket. Alternatively, however, it may be located in the central portion of the ticket. In this case, it is necessary only that the write and read heads for writing in or reading the information from that portion of the magnetic record layer which corresponds to the display record section be arranged in pairs, upper and lower.

According to the above-described embodiments, moreover, the recording of the magnetic latent image in the character pattern in the magnetic record layer is confirmed by the presence of the latent image in the character pattern. Alternatively, however, the recording may be confirmed by reading all the character pattern of the latent image and checking it for coincidence with the written character pattern, or by converting the read character pattern into a character code and checking it for coincidence with the character coded recorded by encoding.

According to the embodiments described herein, furthermore, the information is recorded again when the magnetic latent image corresponding to the character pattern is to be identified, or in case of wrong information recording. Alternatively, however, such a situation may be tackled by terminating the transaction on the supposition that the commutation ticket is jammed, or by reinserting the ticket.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for processing a recording medium which has a magnetic recording layer and a plurality of recording tracks on the magnetic recording layer at first intervals, said apparatus comprising:
   means, having a plurality of reading portions arranged at the first intervals, for reading information recorded in the recording tracks;
   means for storing reference information;
   means for detecting a predetermined relationship between the information read by the reading means and the reference information stored in the storing means; and
   means, having a plurality of recording portions arranged at second intervals narrower than the first intervals, for recording a predetermined character pattern as a magnetic latent image in the magnetic recording layer when the detecting means detects the predetermined relationship.

2. An apparatus for processing a record medium, comprising:
   first writing means for recording encoded magnetic information in the record medium, the first writing means including a plurality of magnetic heads arranged at first intervals;
   reading means for reading the encoded magnetic information, recorded by the first writing means, from the record medium;
   decision means for determining whether the information read by the reading means is proper or not; and
   second writing means for recording a character pattern in the form of a magnetic latent image corresponding to the information read by the reading means when it is concluded by the decision means that the read information is proper, the second writing means including a plurality of magnetic heads arranged at second intervals narrower than the first intervals.

3. An apparatus for processing a record medium, comprising:
   first reading means for reading encoded magnetic information recorded in the record medium;
   first decision means for determining whether the information read by the first reading means is proper or not;
   first recording means for recording new encoded magnetic information in the record medium when it is concluded by the first decision means that the read information is proper;
   second recording means for recording a predetermined character pattern as a magnetic latent image in the record medium when it is concluded by the first decision means that the read information is proper;
   second reading means for reading the information recorded by the first recording means after the recording by the second recording means is finished; and
   second decision means for determining, by the information read by the second reading means, whether the information recorded by the first recording means is proper or not.

4. An automatic wicket apparatus located at a wicket, for processing an inserted record medium having a magnetic record layer, said apparatus comprising:
   transportation means for transporting the inserted record medium in a predetermined direction;
   first reading means arranged along the transportation means, for reading encoded magnetic information for entrance or exit recorded in the record medium;
   first decision means for determining whether the encoded magnetic information read by the first reading means is proper or not;
   first recording means arranged next to the first reading means with respect to the transportation direction, on the transportation path, for recording new encoded magnetic information for entrance or exit in the record medium when it is concluded by the first decision means that the read information is proper;
   second recording means arranged next to the first recording means with respect to the transportation direction, on the transportation path, for recording information for entrance or exit in the form of a magnetic latent image of a predetermined character pattern in the record medium when it is concluded by the first decision means that the read information is proper;
   second reading means arranged next to the second recording means with respect to the transportation direction, on the transportation path, for reading the character pattern recorded by the second recording means;

second decision means for determining, by the character pattern read by the second reading means, whether the character pattern is properly recorded or not;

third reading means arranged next to the second reading means with respect to the transportation direction, on the transportation path, for recording the encoded magnetic information recorded by the first recording means; and third decision means for determining, by the information read by the third reading means, whether the encoded magnetic information recorded by the first recording means is proper or not.

5. A record medium comprising:
a plate-shaped base;
a first magnetic record layer formed on the base for recording encoded magnetic information;
a second magnetic record layer formed on the base for recording character information; and
a magnetic shielding layer formed on the first magnetic record layer and shielding the first magnetic record layer lest magnetic force from the encoded magnetic information recorded in the first magnetic record layer leak to the outside.

6. A record medium according to claim 5, wherein said base has first and second surfaces opposite to each other, and said first and second magnetic record layers are arranged side by side on the first surface.

7. A record medium according to claim 5, wherein said base has first and second surfaces opposite to each other, and said first and second magnetic record layers are arranged on the first and second surfaces, respectively.

8. A record medium according to claim 5, wherein said first magnetic record layer is formed of a material having a predetermined coercive force, and said second magnetic record layer is formed of a material having a coercive force smaller than the predetermined coercive force.

9. An apparatus for reading from and writing information in a record medium which includes a first magnetic record layer for recording encoded magnetic information, a second magnetic record layer for recording character information as a magnetic latent image adapted to be visualized by magnetic latent image visualizing means, and a magnetic shielding layer of a soft magnetic material covering and shielding the first magnetic record layer lest magnetic lines of force from the encoded magnetic information recorded in the first magnetic record layer leak to the outside, said apparatus comprising:

transportation means for transporting the record medium along a predetermined transportation path;

first reading means arranged along the transportation path, for reading encoded magnetic information written in the first magnetic record layer, the first reading means including generating means for generating magnetism to saturate the magnetic shielding layer of the record medium magnetically;

first writing means arranged along the transportation path, for writing updated encoded magnetic information in the first magnetic record layer of the record medium;

second writing means arranged on the transportation path, for writing the character information as the magnetic latent image in the second magnetic record layer of the record medium;

second reading means arranged along the transportation path, for reading the character information written in the second magnetic record layer by the second writing means;

third reading means arranged along the transportation path, for reading the updated encoded magnetic information written in the first magnetic record layer by the first writing means, the third reading means including generating means for generating magnetism to saturate the magnetic shielding layer magnetically; and means for determining whether the character information read by the second reading means and the encoded magnetic information read by the third reading means are proper or not.

* * * * *